H. Goldsmith, Jr.,
Commode.

No. 9,770.   Patented June 7, 1853.

UNITED STATES PATENT OFFICE.

HERMAN GOLDSMITH, JR., OF NEW YORK, N. Y.

WATER-CLOSET.

Specification of Letters Patent No. 9,770, dated June 7, 1853.

*To all whom it may concern:*

Be it known that I, HERMAN GOLDSMITH, Jr., of the city, county, and State of New York, have invented certain new and useful Improvements in Portable Water-Closets; and I do hereby declare that the following is a full, clear, and exact description of the same, reference being had to the annexed drawing, making a part of this specification, in which—

Figure 1:
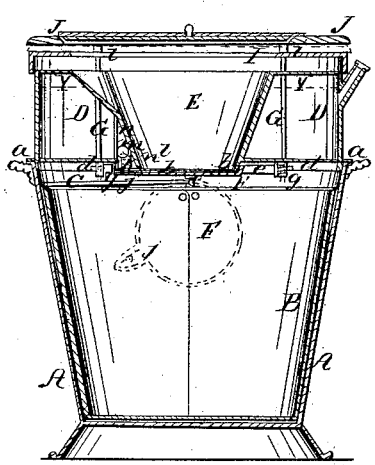
Figure 2:
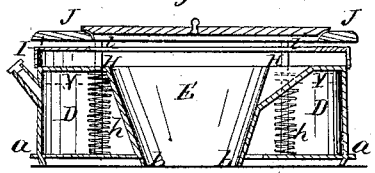
Figure 3:
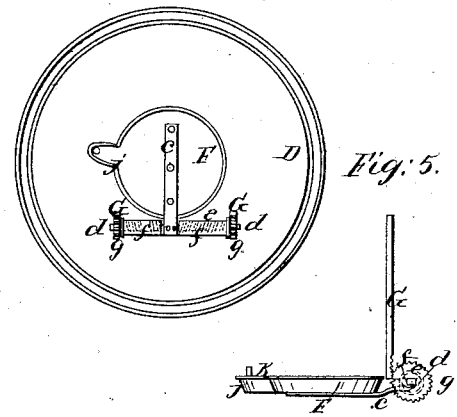
Figure 4:
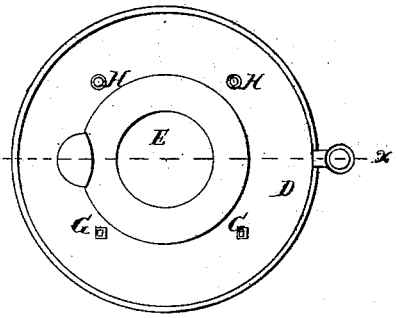
Figure 5:
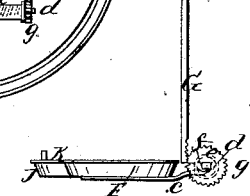

Figure 1, is a vertical section of the water-closet, taken at the line X, X, Fig. 4. Fig. 2, is a vertical section of the upper part of the water-closet (the water chamber) this is a view of that part of the closet opposite to that seen in Fig. 1, the closet being supposed to be bisected as indicated by the line X, X, Fig. 4. Fig. 3, is an under or bottom view of the water chamber. Fig. 4, is a view of the top of the water-chamber. Fig. 5, is a section showing the manner in which the pan is operated.

Similar letters of reference indicate corresponding parts in each of the several figures.

This invention relates to certain improvements in portable water-closets, and consists in having an annular water chamber at the upper part of the closet which contains a valve so arranged as to open when the pan or basin closes and allow a requisite quantity of water to pass around the pan or basin and between the pan or basin and the flange of the orifice when the pan or basin closes, thus hermetically sealing the orifice and preventing the escape of effluvia, said valve closing when the pan or basin is opened and thus preventing the escape of water from the chamber.

To enable others skilled in the art to construct water-closets upon my improved plan I will proceed fully to describe their construction and the manner in which they operate.

A, Fig. 1, represents the lower part or vessel of the closet which contains a pail B, said pail fitting closely within the lower part A, of the closet, and having a handle or bail C, by which the pail may be withdrawn from the part A, when desired. On the top of the lower part or vessel A, there is fitted an annular water chamber D, said chamber having a flange (*a*) around its outer and lower part which rests upon the top edge of the lower part or vessel A. The water chamber D has an air tight covering on its upper part and has an opening E, through its center of an inverted conical shape, said opening having a flange (*b*) projecting downward around its lower orifice, see Figs 1, and 2, a short distance below the bottom of the water chamber D.

F, is a pan or basin which, when closed covers the lower orifice of the opening E, and fits closely around the flange (*b*) see Fig. 1. This pan or basin is attached by a metal strap (*c*) to a shaft (*d*) which rests in suitable bearings on the under surface of the water-chamber see Fig. 3. The shaft (*d*) is inclosed within a tube (*e*) and has spiral springs (*f*) (*f*) wound around it, and also has two pinions (*g*) (*g*) one at each end into which pinions racks G, G, mesh, said racks passing up through the water chamber D. Now it will be seen that if the racks G, G, be depressed, the pinions (*g*) (*g*) and shaft (*d*) will turn and consequently the pan or basin F, be depressed. H, H, are two rods having spiral springs (*h*) (*h*) around them said rods passing up through the water-chamber at points opposite to the racks G, G, see Figs. 2, and 4. I, is a cap which rests upon the upper parts or top ends of the racks G, G, and rods H, H, said cap being secured to the tops of the racks and rods by screws (*i*) the heads of which project some distance upward see Fig. 1. On the top of the heads of the screws there rests a wooden seat J, see Figs. 1, and 2.

The manner in which the pan or basin is operated will now be readily seen. A person in using the closet sits upon the wooden seat J, and of course depresses the racks G, G, which causes the pan or basin F, to open, see red lines in Fig. 1. The excrement falls to the bottom of the pail B, in the lower part or vessel A, of the closet. When the person rises from the seat J, the pan or basin F, closes and the seat J, is elevated to its original position by the action of the spiral springs (*f*) (*f*) around the shaft *d*. Thus the pan or basin is opened in using the closet and closed when the closet is not in use without any trouble on the part of the person using it, and the effluvia arising from the excrement prevented from filling the room by the closing of the pan or basin which cuts off the communication from the lower part to the top of the closet.

The two rods H, H, with their springs (*h*) (*h*) are merely for the purpose of causing the wooden seat J, as it is raised and depressed to be in a horizontal position. As the racks G, G, pass up through the cap I, and bear on one side of the seat the rods H, H, and their springs or something equivalent thereto is necessary to support the opposite side of the seat.

It would be extremely difficult to have the pan or basin F, when closed fit sufficiently tight around the flange (b) as to prevent thoroughly the escape of all effluvia and at the same time have the pan or basin work easily. To remedy this difficulty I employ the water chamber D, which is to contain at all times, when the closet is used, a quantity of water, see Figs. 1 and 2, Y, Y, representing the water line. The pan or basin F, has a nozzle or projection (j) at its side plainly seen in Figs. 3 and 5, and this nozzle or projection has a small vertical rod (k) attached to it. At the bottom of the water chamber D, there is a circular opening (l), see Fig. 1, which is directly over the nozzle or projection (j) of the pan or basin F, when closed. Within the water chamber and directly over the circular opening (l) there is a ball or sphere (m) kept over the opening (l) by guides (n) (n). Now when the pan or basin is open and the closet in use the ball or sphere (m) settles by its own gravity over the opening (l) and prevents the escape of water from the chamber D, but when the pan or basin closes the small rod (k) passes up through the opening (l) and throws up the ball or sphere allowing the water from the chamber D, to pass all around the pan or basin and between the pan or basin and the flange (b) thus hermetically sealing the lower orifice of the opening E, and thoroughly preventing the escape of any effluvia. The red lines in Fig. 1, show the position of the ball and basin when the closet is in use.

I do not confine myself to the exact modes herein given of operating the pan or basin F, and valve in the water chamber, because there may be many equivalent modifications of these modes. Neither do I confine myself to any precise form of valve.

The water can not escape from the chamber, D, in any undue quantity, because there is no atmospheric pressure above, it being closed air-tight; and the rod, when the pan or basin, F, is closed, elevates the ball or sphere sufficiently high to allow the requisite quantity of water to flow into the pan. The springs, (f,) (f), to which the pan or basin is attached, are sufficiently strong to sustain all the water in the pan or basin, and to keep said pan or basin sufficiently tight against the flange, to prevent the water from escaping over the top of the basin into the pail beneath.

Having thus described the nature and operation of my invention, what I claim as new and desire to secure by Letters Patent is,

The annular water chamber D, at the upper part of the closet with a valve so arranged as to open when the pan or basin closes and allow a requisite quantity of water to pass around the sides of the pan or basin and between the sides of the pan or basin and the flange (b) of the orifice, thus hermetically sealing the orifice and preventing the escape of effluvia, said valve also closing when the pan or basin is opened and thus preventing the escape of water from the chamber, the valve being constructed of a sphere or ball (m) working over a circular opening (l) in the bottom of the water chamber, or constructed in any other manner, it being understood that I do not claim the water chamber independent of its valve to operate as above stated.

H. GOLDSMITH, Jr.

Witnesses:
O. D. MUNN,
R. W. FENWICK.